Nov. 10, 1964     W. G. WADEY     3,156,399

FLUID BEARING

Filed Oct. 23, 1961

*INVENTOR.*
WALTER G. WADEY

BY *Edward M. Farrell*

*ATTORNEY*

3,156,399
FLUID BEARING
Walter G. Wadey, Wynnewood, Pa., assignor to Sperry Rand Corporation, New York, N.Y., a corporation of Delaware
Filed Oct. 23, 1961, Ser. No. 146,992
2 Claims. (Cl. 226—97)

This invention relates to fluid bearings, and more particularly to fluid bearings made of porous material. Still more particularly, the invention relates to bearings for use in a tape handling system.

Porous fluid bearings are well known in the art. Such bearings are generally made by compressing and subsequent sintering of a mixture of suitable ingredients, such as metal powders. The resulting porous body, generally of cylindrical form, may take up to 35% of a fluid lubricant, for example oil.

In addition to being used as axle bearings and in other applications, such porous bearings may be used as drive and guide rollers for web-like structures, for example, a magnetic tape. In such applications, the bearing fluid is of gaseous nature and is generally air. The fluid is supplied at an elevated pressure at the hollow center portion of the bearing. The fluid then flows through the pores of the bearing leaving the bearing at its circumference to create a thin layer of supporting air between the periphery of the bearing and tape or other web-type element. This arrangement provides a substantially frictionless support for the tape.

In tape handling machines, the use of porous fluid bearings as tape guiding means instead of the conventional rotating idler pulleys is known. Such fluid bearings are particularly advantageous in tape handling machines which form part of computer systems since the tape speeds in such systems are very high. The fluid bearings in such systems, while fixedly mounted, provide substantially frictionless support for the tape. Further, when stationary fluid bearings are used, there is no need to accelerate and decelerate bearing members, as when idler pulleys are used, for example.

In prior art fluid bearings, the consumption of the fluid involved is considerable. The reason for this is that the fluid pressure must be relatively high in order to provide a safe and continuous clearance between the tape and the bearing.

Previously, in order to reduce the fluid consumption, fluid bearings have been provided with one or more inserts. For example, sector-shaped blocks have been employed to cover that area of the bearing where no actual support of the tape is required. Thus, in these cases, the bearing fluid is only permitted to penetrate the area of the bearing which is not covered by the block. A disadvantage in the use of such a block, however, is that it must be machined extremely accurate in order to provide for an efficient seal between the block and the bearing.

It may be desirable for certain applications to provide for a gradual change in permeability in certain parts of the bearing. Such gradual changes in permeability can not, however, be obtained by the use of a block of the type described or other known means employed in the prior art.

It is an object of this invention to provide a fluid bearing in which fluid consumption is minimized.

It is a further object of this invention to provide a fluid bearing which includes areas of controlled permeability.

According to the invention, a porous fluid bearing is provided in which the permeability is restricted to certain desired areas. Certain areas of the bearing are surface treated to render them impermeable to fluid.

Further objects and advantages of the present invention will be apparent to those skilled in the art from the following description of the external constructional forms and of the principle of operation of the invention, reference being made to the accompanying drawing, in which.

Figure 1:
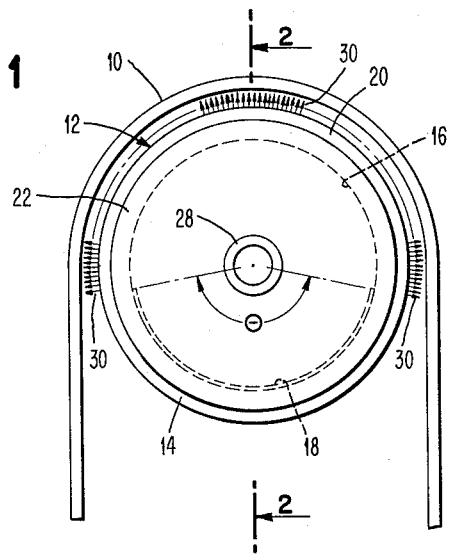
FIG. 1 illustrates a side view of a fluid bearing according to the invention.
Figure 2:
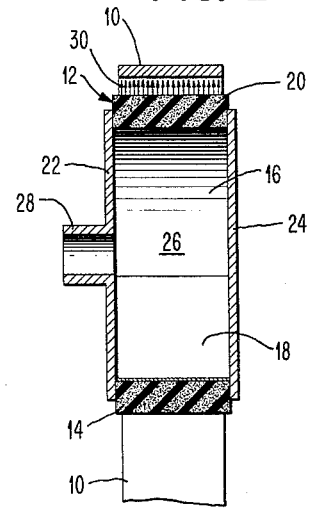
FIG. 2 illustrates a cross-sectional view taken along the line 2—2 of FIG. 1.

Referring to FIGS. 1 and 2 of the drawing, a magnetic recording tape 10 is adapted to be supported by pressure caused by a fluid from a substantially cylindrical body 12. The cylindrical body or cylinder 12 is made of porous material and may be of the porous fluid bearing type as is well known in the art of bearings, where oil has been removed from the bearing by means of washing or other suitable method.

A portion 14 of the inner periphery or wall 16 of the cylinder 12 is coated with a suitable substance 18, which is adapted to close the superficial pores in the wall 16 within the portion 14. The substance 18 will consequently render the portion 14 of the wall 16 impermeable to fluid. The portion 14 covers an angle $\theta$ i.e. the arc over which no actual support of the tape by the bearing is required. A remaining portion 20 of the bearing, i.e. the portion from which the fluid flows to support the tape, is not coated with any impermeable substance and therefore retains its original permeability.

The cylinder 12 includes a pair of discs 22 and 24 on opposite sides to provide an enclosed space 26 within the bearing. The disc 22 is connected to tubing means 28 which connects the enclosed space 26 to a source of bearing fluid under pressure, such as an air compressor (not shown). Such a bearing fluid is generally of a gaseous nature, such as air. When the bearing fluid under pressure is supplied to the space 26 of the cylinder 12, the fluid will only pass through the pores of the non-coated portion 20 of the bearing and leave the periphery of the cylinder 12 within the arc spanned by the tape 10. As a result of the pressure of the fluid leaving the periphery of the cylinder, a thin layer of supporting fluid 30 is created between the cylinder and the tape, thereby lifting the tape away from the cylinder.

As a result of the non-permeability of a considerable portion of the bearing, the consumption of bearing fluid is substantially reduced. If the substance 18 were not included on a portion of the inner periphery of the bearing (as in prior art devices), a considerable amount of fluid under pressure would have to be provided to assure that the layer of air 30 would be of sufficient pressure to support the tape 10. It is thus seen that one of the features of the present invention is to provide a tape support system in which efficient use is made of the source of the fluid.

The substance 18 used to coat part of the inner wall 16 of the cylinder 12 may be one of various materials. One such effective and inexpensive material is paint. Paint can be easily applied and it will effectively seal the superficial pores of the underlying material. It is also relatively durable. Other types of material which may be easily applied and which possess the characteristics of impermeability will be readily apparent to those skilled in the art.

Instead of closing the pores by the application of a coating, other methods may also be used to advantage.

For example, an efficient way to close the superficial pores of the material would be the chemical deposition of a suitable substance within the desired area or areas. The method of vacuum metal evaporation coating can also be used advantageously to obtain areas impermeable to fluid. The areas of the bearing which are not to be coated could be shielded by suitably designed masks so that deposition of the metal will occur only in the remaining or unmasked areas. Another possible method of locally closing the superficial pores is the method of high frequency heat treatment. According to this method, a heat field of very small depth is created in the material so that the material located within the heat field melts and starts to flow so that the pertaining superficial pores will be closed. Such a method has the advantage that the surface thus obtained is machinable to close tolerances and that it is very durable. Other applicable methods known in the extensive field of surface treatment will readily come to the mind of those skilled in the art.

In some cases it may be desirable to provide fluid bearings with portions of the bearing being impermeable to fluid with the portions being of varying degrees of permeability. In these cases, the surface treated areas of the bearing may be bound by a certain pattern instead of by straight lines as shown and discussed.

Figure 3:
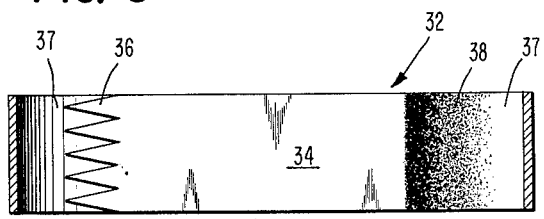
FIG. 3 illustrates a cross-sectional view of a modification of a bearing similar in shape to that illustrated in FIGURE 1, looking downward from the center of the bearing.

Referring particularly to FIG. 3, there is shown a view of a part of a cylindrical fluid bearing 32. This may be a bearing similar in shape to the one illustrated in FIGURE 1 and may be considered as a cross-sectional downward view taken through the middle of the bearing.

An area 34 of the inner wall of the bearing 32 is surface-treated according to one of the methods discussed above. The treated area 34 is bounded on its left hand side by a pattern made up of triangles such as 36, and on its right-hand side by a border area 38 in which the material deposited on the bearing gradually decreases in density. For instance, assuming that the treated area 34 was achieved by means of the metal vacuum deposition method, then the border area 38 may be considered an area wherein the thickness of the deposited metal film gradually changes so that, going from right to left, the number of surface pores closed increases gradually until all pores are closed by the deposited metal atoms at the surface 34. The triangular pattern 36 may be obtained by the use of a mask of suitable design as is well known to those skilled in the art of vacuum deposition. The area 37 is free of deposited metal and is therefore completely porous and will therefore permit fluid to pass therethrough.

Figure 4:
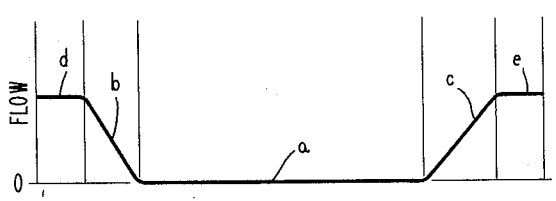
FIG. 4 illustrates a graphical representation of the fluid flow as a function of the permeability of the bearing illustrated in FIG. 3.

FIG. 4 depicts a graph illustrating the changes in the rate of flow of fluid in a bearing according to FIG. 3. It will be noted that the branch $a$ of the graph, corresponding to the surface-treated area 34, indicates no flow of fluid. Branch $b$ of the graph, corresponding to the triangular pattern 36, indicates an increased flow of fluid in this area, dependent on the area-ratio of the treated and non-treated triangles. Branch $c$ of the graph, which corresponds to the area 38 of gradually decreasing density of deposited metal, indicates a more gradual transition from the area of no flow of fluid to the area of full flow of fluid. The branches $d$ and $e$ of the graph correspond to the remaining non-treated portion of the bearing having unrestricted flow of fluid.

Various other ways may be employed to achieve variable fluid flow at different areas of the bearing. While only two ways have been illustrated, other ways will be apparent to those skilled in the art. Also, it is apparent that any selected areas of a bearing may be coated to achieve certain desired results in particular applications.

What is claimed is:

1. A fluid guide bearing adapted to support a web over a certain angle of contact, said bearing comprising a closed cylindrical body including a first surface portion of porous material, a second surface portion impermeable to bearing fluid and third surface portions having varying degrees of permeability to said bearing fluid, and said first and third surface portions extending over an angle substantially equal to said angle of contact.

2. A fluid guide bearing according to claim 1, wherein said third portions having varying degrees of permeability form transition regions between said second portion impermeable to bearing fluid and said first portion permeable to bearing fluid.

References Cited by the Examiner

UNITED STATES PATENTS

| | | |
|---|---|---|
| 2,228,406 | Schmidt | Jan. 14, 1941 |
| 2,855,249 | Gerard | Oct. 7, 1958 |
| 2,908,495 | Andrews et al. | Oct. 13, 1959 |
| 2,953,289 | Young | Sept. 20, 1960 |
| 3,032,246 | Fritze | May 1, 1962 |

FOREIGN PATENTS

| | | |
|---|---|---|
| 570,795 | Great Britain | July 23, 1945 |

OTHER REFERENCES

"Flotation and Edge Guiding of Paper Web for Electrostatic Printing Press," Radio Corp of America; Technical Notes, T.N. No. 457, September 1961, 2 sheets.

WILLIAM W. DYER, JR., Primary Examiner.

ARTHUR P. KENT, Examiner.